United States Patent [19]

Chung et al.

[11] Patent Number: 5,601,725
[45] Date of Patent: *Feb. 11, 1997

[54] HYDROPHOBICALLY MODIFIED POLYMERS FOR SLUDGE DEWATERING

[75] Inventors: Daniel K. Chung, Burlington, Canada; Chandrashekar S. Shetty; Manian Ramesh, both of Lisle, Ill.

[73] Assignee: Nalco Chemical Company, Naperville, Ill.

[*] Notice: The term of this patent shall not extend beyond the expiration date of Pat. No. 5,429,749.

[21] Appl. No.: 546,660

[22] Filed: Oct. 23, 1995

[51] Int. Cl.$^6$ ..................................... C02F 11/14
[52] U.S. Cl. ..................... 210/727; 162/189; 210/734; 210/928
[58] Field of Search ................ 210/725, 727, 210/728, 734, 735, 928; 162/189

[56] References Cited

U.S. PATENT DOCUMENTS

| | | |
|---|---|---|
| 3,409,546 | 11/1968 | Mogelnicki et al. ............ 210/728 |
| 3,414,514 | 12/1968 | Buhl ........................... 210/734 |
| 3,897,333 | 7/1975 | Field et al. ................... 210/734 |
| 3,928,448 | 12/1975 | Ballweber et al. ............ 260/567.6 P |
| 4,151,202 | 4/1979 | Hunter et al. ................ 526/310 |
| 4,191,645 | 3/1980 | Begala et al. ................ 210/734 |
| 4,479,879 | 10/1984 | Hashimoto et al. ........... 210/727 |
| 5,234,604 | 10/1993 | Liao et al. .................. 210/734 |
| 5,283,306 | 2/1994 | Ramesh et al. .............. 524/922 |
| 5,429,749 | 7/1995 | Chung et al. ................ 210/727 |

*Primary Examiner*—Peter A. Hruskoci
*Attorney, Agent, or Firm*—Robert A. Miller; James J. Drake; Patricia A. Charlier

[57] ABSTRACT

A method for the dewatering of sludges in industrial waste waters utilizing a hydrophobically-modified coagulant copolymer of diallyldimethyl ammonium chloride and quaternized dimethylaminoethyl acrylate or quaternized dimethylaminoethylmethacrylate and a flocculant.

4 Claims, No Drawings

HYDROPHOBICALLY MODIFIED POLYMERS FOR SLUDGE DEWATERING

FIELD OF THE INVENTION

A method for the dewatering of sludges in industrial waste waters utilizing a hydrophobically-modified coagulant copolymer of diailyldimethyl ammonium chloride and quaternized dimethylaminoethyl acrylate or quaternized dimethylaminoethylmethacrylate and a flocculant.

BACKGROUND OF THE INVENTION

Cationically charged water soluble or water dispersible polymers are utilized in a variety of processes that involve the separation of solids or immiscible liquids which are dispersed or suspended in water from water, and the subsequent dewatering of solids containing water. These types of polymers, which may be natural or synthetic, are broadly termed coagulants and flocculants.

Cationically charged polymers neutralize the anionic charge of the suspended solids or liquids which are to be removed. These solids or liquids may be waste which must be removed from water. Alternatively, the solids may be desirable products which are recovered from aqueous systems, such as coal fines, which can be coagulated or flocculated and thereafter sold as fuel.

When it is desirable to remove suspended solids, which are suspensions of organic matter of a proteinaceous or cellulosic nature, a variety of processes may be utilized, including sedimentation, straining, flotation, filtration, coagulation, flocculation and emulsion breaking. Additionally, after suspended solids are removed from the water, they must often be dewatered so that they may be further treated or properly disposed of. Liquids treated for solids removal often have from as little as several parts per billion of suspended solids or dispersed oils, to very large amounts of suspended solids or oils. Solids being dewatered, for example sludges obtained from the biological degradation of wastewater, may contain anywhere from 0.25 weight percent solids, up to about 40 or 50 weight percent solids material. Liquid/solids separation processes are designed to remove solids from water, or liquids from solids.

While strictly mechanical means have been used to effect solids/liquid separation, modern methods often rely on mechanical separation techniques which are augmented by synthetic and natural cationic polymeric materials to accelerate the rate at which solids can be removed from water. These processes include the treatment of raw water with cationic coagulant polymers which settle suspended inorganic particulates and make the water usable for industrial or municipal purposes. Other processes requiring solids/liquid separation include the removal of colored soluble species from paper mill effluent wastes, the use of organic flocculant polymers to flocculate industrial and municipal waste materials, sludge recovery and emulsion breaking.

Regarding the mechanism of separation processes, particles in nature have either a cationic or anionic charge. Accordingly, these particles often are removed by a water soluble coagulant or flocculant polymer having a charge opposite to that of the particles to be removed. This is referred to as a polyelectrolyte enhanced liquid/solids separation process, wherein a water soluble or dispersible ionically charged polymer is added to neutralize the charged particles or emulsion droplets to be separated.

The dewatering of sewage sludges and similar organic suspensions, may be augmented by mixing into them chemical reagents in order to induce a state of coagulation or flocculation which thereby facilitates the process of separation of water. For this purpose, lime or salts of iron or aluminum have been utilized. More recently, synthetic polyelectrolytes, particularly certain cationic copolymers of acrylamide have been found to be useful.

Exemplary of cationic polymers for dewatering is U.S. Pat. No. 3,409,546 which describes the use of N-(amino methyl)-polyacrylamides in conjunction with other cationic polymers for the treatment of sewage sludges. U.S. Pat. No. 3,414,514 describes the use of a copolymer of acrylamide and a quaternized cationic methacrylate ester. Utilization of polyethyleneimines and homopolymers of cationic acrylates and methacrylates and other cationic polymers such as polyvinyl pyridines is also known. Another class of cationic polymers used to dewater sludges is described in U.S. Pat. No. 3,897,333.

Another example of a cationic polymer useful for sludge treatment is U.S. Pat. No. 4,191,645, in which cationic copolymers prepared from a nonionic monomer, such as acrylamide, and a cationic monomer, such as trimethylammoniumethylmethacrylate methyl sulfate quaternary (TMAEM.MSQ) or dimethylaminoethylacrylate methyl sulfate quaternary (DMAEM.MSQ) are disclosed. Further examples of polymeric treatments for sludge dewatering include the 1,4-dichloro-2-butene dimethylamine ionene chloride polymer disclosed in U.S. Pat. No. 3,928,448 and the block copolymers disclosed in U.S. Pat. No. 5,234,604.

Notwithstanding the variety of commercially available polymers which have been found to be capable of flocculating or coagulating organic sludges, there are various circumstances which tend to limit the usefulness of these reagents. Thus, while for certain sludges economical treatments with these known reagents are feasible, more often sludges require very high and cost-ineffective dosages of reagents in order to treat them successfully. Moreover, variations often occur in sludge from any one source. For example, variations in the supply of material to the sludge making process and/or in the oxidizing conditions that may be involved in the production of the sludge lead to a variety of particle types which must be removed. Furthermore, it is not uncommon to encounter sludges which are, for some reason, not amenable to flocculation by any of the known polymeric flocculating agents. It is therefore an object of the invention to provide to the art a superior method for the dewatering of sludge-containing industrial waste waters.

SUMMARY OF THE INVENTION

A method for the dewatering of sludges in industrial waste waters utilizing a hydrophobically-modified coagulant copolymer of diallyldimethyl ammonium chloride and quaternized dimethylaminoethyl acrylate or quaternized dimethylaminoethylmethacrylate and a flocculant.

DESCRIPTION OF THE INVENTION

The invention is a method for the dewatering of sludge-containing industrial waste water comprising the steps of:

A. adding to the sludge-containing industrial waste water an effective dewatering amount of a hydrophobically-modified polyelectrolyte copolymer coagulant selected from the group consisting of diallyldimethyl ammonium chloride-co-dimethylaminoethylacrylate benzyl chloride quaternary, diallyldimethyl ammonium chloride-co-dimethylaminoethylacrylate cetyl chloride quaternary, diallyldimethyl ammonium chloride-co-dimethylaminoethylmethacrylate benzyl chloride quaternary, diallyldimethyl ammonium chloride-co-dimethylaminoethylmethacrylate cetyl chloride quaternary and diallyldimethyl ammonium chloride-co-ethylhexyl acrylate;

B. adding to the sludge-containing coagulant treated industrial waste water an effective dewatering amount of a flocculant selected from the group consisting of acrylamide-co-acrylic acid, acrylamide-co-dimethyl aminoethyl acrylate methyl chloride quaternary and poly(acrylamide), C. allowing the sludge-containing industrial waste water to separate into a water phase and a sludge phase; and D. recovering said separated phases.

As used herein, the term sludge refers to suspensions of organic matter of a proteinaceous or cellulosic nature. The industrial waste water may be municipal waste water or papermaking waste water. Furthermore, the hydrophobically-modified polyelectrolyte copolymer may be added to the industrial waste water in an amount of between 0.03% to about 1% by weight of said waste water. The hydrophobically-modified polyelectrolyte copolymer consists of diallyldimethyl ammonium chloride and the hydrophobically associating monomer which are present in a molar ratio in the range from 99:1 to 20:80.

The wastes and sludges which are treatable to effect dewatering thereof by the polymers of the present invention are of diversified character. They comprise industrial wastes, municipal wastes such as sewage or activated sewage sludges, and biological wastes or sludges which may constitute secondary anaerobically or aerobically digested sludges. It is well recognized that particular wastes or sludges vary in their dewatering characteristics and in their contents of solids. Illustrative of such wastes or sludges are those which contain from about 1 to about 3 weight percent of solids.

The addition is usually effected by adding an aqueous solution of the polymer, for example, having a concentration of 0.01 to 1 percent by weight and, most preferably, from 0.05 to 0.2 percent concentration. The total amount of polymer added may vary considerably according to the suspension being treated and according to the degree of dewatering required. Typical addition rates for a sewage sludge would be in the range 0.1 to 0.5 percent of polymer on total weight of sludge solids. Addition may be by conventional methods and naturally some agitation of the mixture of sludge and flocculant is necessary to bring about flocculation. Thereafter separation of the separated solids from liquid may be effected by conventional methods, such as filtration and/or sedimentation.

It has been discovered that the performance of poly(DADMAC) can be significantly improved by incorporating a certain degree of hydrophobic nature. Such a hydrophobic modification can be accomplished by copolymerizing DADMAC with hydrophobicically modified monomers, such as DMAEA•BCQ, DMAEM•BCQ, DMAEA•CCQ, DMAEM•CCQ, and alkyl acrylates, preferably ethylhexyl acrylate.

Therefore, the hydrophobic copolymers of the invention are copolymers including diallyldimethylammonium chloride (DADMAC) monomer and a hydrophobically modified monomer. Preferably, the hydrophobically modified monomer is preferably selected from an appropriately quaternized dimethylaminoethylacrylate (DMAEA) or dimethylaminoethylmethacrylate (DMAEM). DMAEM salts of other mineral acids such as DMAEM•hydrochloride, DMAEM•$H_2SO_4$. DMAEM•phosphate, and DMAEM•nitrate, as well as organic acid salts, such as DMAEM•acetate, DMAEM•oxalate, DMAEM•citrate, DMAEM•benzoate and DMAEM•succinate can also be used.

The quaternized DMAEA and DMAEM monomers may include $C_4$ to $C_{20}$ chloride quaternaries. The $C_4$ to $C_{20}$ chloride quaternaries may be either aliphatic (e.g., cetyl chloride quaternary (CCQ)) or aromatic (e.g., benzyl chloride quaternary (BCQ)). Sulfate, bromide or other similar quaternaries can also be used in place of the chloride quaternary. The preferred ester of acrylic acid or methacrylic acid is ethylhexyl acrylate. Other preferred hydrophobically associating monomers of the invention include vinylpyrolidone, styrene, vinylformamide, vinylacetamide, vinylpyridine, and vinylmaleimide.

The DADMAC can be prepared in accordance with any conventional manner such as the technique described in U.S. Pat. No. 4,151,202 (Hunter et al.), which issued on Apr. 24, 1979, and which is incorporated herein by reference.

The quaternized dimethylaminoethylacrylate is selected from the group consisting of: dimethylaminoethylacrylates having $C_4$ to $C_{20}$ chloride quaternary. The dimethylaminoethylacrylates having $C_4$ to $C_{20}$ chloride quaternary are preferably either dimethylaminoethylacrylate benzyl chloride quaternary or dimethylaminoethylacrylate cetyl chloride quaternary.

The quaternized dimethylaminoethylmethacrylate is selected from the group consisting of: dimethylaminoethylmethacrylates having $C_4$ to $C_{20}$ chloride quaternary. The dimethylaminoethylmethacrylates having $C_4$ to $C_{20}$ chloride quaternary are preferably either dimethylaminoethylmethacrylate benzyl chloride quaternary or dimethylaminoethylmethacrylate cetyl chloride quaternary.

The diallyldimethyl ammonium chloride and the hydrophobically modified monomer are preferably present in a molar ratio in the range from 99:1 to 20:80. The hydrophobically modified DADMAC copolymers of the invention are described in detail in U.S. Pat. No. 5,283,306, the disclosure of which is herein incorporated by reference.

By way of example, suitable hydrophobically modified polymer coagulants that may be used in the present invention include hydrophobic coagulants selected from the group consisting of hydrophobically modified copolymer of diallyldimethyl ammonium chloride and a hydrophobically modified copolymer of acrylamide. More preferably, the hydrophobically modified diallyldimethyl ammonium chloride polymer is a copolymer selected from the group consisting of diallyldimethyl ammonium chloride-co-dimethylaminoethylacrylate benzyl chloride quaternary, diallyldimethyl ammonium chloride-co-dimethylaminoethylacrylate cetyl chloride quaternary, diallyldimethyl ammonium chloride-co-dimethylaminoethylmethacrylate benzyl chloride quaternary, and diallyldimethyl ammonium chloride-co-dimethylaminoethylmethacrylate cetyl chloride quaternary.

The flocculant which may be used in this program may be anionic, non-ionic or cationic. Anionic flocculants are exemplified by AcAm/sodium or ammonium (meth)acrylate copolymers, poly (sodium or ammonium (meth)acrylate), AcAm/sodium AMPS copolymers, homo or copolymers vinylsulfonic acid, and homo or copolymers of maleic acid. Non-ionic flocculants include, poly(meth)acrylamide, polyethylene oxide, clays, and bentonite. Cationic flocculants include homo or copolymers of DMAEA or DMAEM quats with AcAm.

The following examples are presented to describe preferred embodiments and utilities of the invention and are not meant to limit the invention unless otherwise stated in the claims appended hereto.

EXAMPLE 1

The following procedure was utilized at a paper mill to obtain the results of Table 1.

1. Measure 200 mls of well-mixed, untreated sludge from the paper mill into a graduated mixing cylinder.
2. Dilute polymer solution to equal 10% of sludge volume using tap water.
3. Place one sheet of belt fabric similar to the plant's belt press on the funnel.
4. Add polymer solution to sludge and mix by inverting the cylinder slowly for 5–10 cycles.
5. Start the stopwatch when the first drop falls from the funnel.
6. Record the flitrate volume (in mls) at 5, 10 and 15 seconds. Observe flitrate clarity (e.g., clear, turbid, poor).

The typical sludge composition for this paper mill is 75% waste activated sludge, 17% primary sludge and 8% rejects from fiber recovering unit. The pH of the system was approximately 7.7 and temperature was 31° C.

TABLE 1

| Polymer | Sludge Dewatering | |
|---|---|---|
| | Dosage (ppm) | 10 sec. drainage (ml) |
| none | — | 115 |
| A | 100 | 365 |
| A | 120 | 390 |
| A | 80 | 325 |
| B | 35 | 162 |
| B | 42 | 177 |
| B | 49 | 250 |
| B | 56 | 292 |
| B | 63 | 300 |
| C | 160 | 250 |
| F/A | 50/120 | 325 |
| F/A | 60/120 | 360 |
| G/B | 16/120 | 275 |
| H/B | 16/120 | 285 |
| I/B | 16/120 | 270 |
| J/B | 20/120 | 290 |
| H/A | 16/80 | 330 |
| I/A | 12/80 | 330 |
| G/A | 12/80 | 335 |
| I/A | 8/80 | 300 |
| G/A | 8/80 | 355 |
| H/A | 8/80 | 290 |
| J/A | 8/80 | 315 |

A = Commercially available dry cationic copolymer of acrylamide and dimethylaminoethyl acrylate methyl chloride quaternary (80/20 mole percent ratio).
B = Solution cationic copolymers of acrylamide and dimethylaminoethyl acrylate methyl chloride quaternary (80/20 mole percent ratio, 35% actives).
C = Ethoxylated phenol (nonionic copolymer).
E = Polyethylene oxide.
F = Copolymer of epichlorohydrin and dimethylamine, 50% actives.
G = Solution cationic copolymer of diallyldimethyl ammonium chloride and dimethylaminoethyl acrylate benzyl chloride quaternary (85/15 mole percent ratio, 20% actives, IV = 1.49).
H = Solution cationic copolymer of diallyldimethyl ammonium chloride and dimethylaminoethyl acrylate benzyl chloride quaternary (95/5 mole percent ratio, 20% actives, IV = 1.6).
I = Solution cationic copolymer of diallyldimethyl ammonium chloride and dimethylaminoethyl acrylate benzyl chloride quaternary (90/10 mole percent ratio, 20% actives, IV = 1.9).
J = Solution cationic copolymer of diallyldimethyl ammonium chloride and dimethylaminoethyl acrylate benzyl chloride quaternary (80/20 mole percent ratio, 20% actives, IV = 1.5).

It is evident from Table I that the coagulants of the instant invention G–J in conjunction with flocculants cause an increase in free drainage, which indicates more efficient dewatering, over other conventional treatments as represented by A, B, C, and F. Greater activity is indicated by a larger amount of drainage within ten seconds. The treatments of the instant invention have equivalent or greater dewatering efficiency, and are effective at much lower dosages.

Changes can be made in the composition, operation and arrangement of the method of the present invention described herein without departing from the concept and scope of the invention as defined in the following claims:

We claim:

1. A method for the dewatering of sludge-containing industrial wastewater containing organic matter of a proteinaceous or cellulosic nature comprising the steps of:

A. adding to the sludge-containing industrial waste water an effective dewatering amount of a hydrophobically-modified polyelectrolyte copolymer coagulant selected from the group consisting of diallyldimethyl ammonium chloride-co-dimethylaminoethylacrylate benzyl chloride quaternary, diallyldimethyl ammonium chloride-co-dimethylaminoethylacrylate cetyl chloride quaternary, diallyldimethyl ammonium chloride-co-dimethylaminoethylmethacrylate benzyl chloride quaternary, diallyldimethyl ammonium chloride-co-dimethylaminoethylmethacrylate cetyl chloride quaternary and diallyldimethyl ammonium chloride-co-ethyl hexyl acrylate;

B. adding to the sludge-containing coagulant treated industrial waste water an effective dewatering amount of a flocculant selected from the group consisting of acrylamide-co-acrylic acid, acrylamide-co-dimethylaminoethyl acrylate methyl chloride quaternary and poly(acrylamide), C. allowing the sludge-containing industrial waste water to separate into a water phase and a sludge phase; and D. recovering said separated phases.

2. The method of claim 1 wherein the industrial waste water is selected from the group consisting of municipal waste water and papermaking waste water and the sludge is selected from the group consisting of industrial waste sludge, activated sewage sludge, sewage sludge, biological sludge, secondary anaerobically digested sludge and secondary aerobically digested sludge.

3. The process according to claim 1 wherein said hydrophobically-modified polyelectrolyte copolymer is added to the industrial waste water in an amount of between 0.03 to about 1.0% by weight of said waste water.

4. The process according to claim 1 wherein said hydrophobically-modified polyelectrolyte copolymer consists of diallyldimethyl ammonium chloride and the hydrophobically-associating monomer which are present in a molar ratio in the range from 99:1 to 20:80.

* * * * *